(12) United States Patent
Wang et al.

(10) Patent No.: US 9,430,584 B2
(45) Date of Patent: Aug. 30, 2016

(54) PROVISION OF SEARCH REFINEMENT SUGGESTIONS BASED ON MULTIPLE QUERIES

(71) Applicants: Heng Wang, Shanghai (CN); Gufei Sun, Shanghai (CN); Wen-Syan Li, Fremont, CA (US)

(72) Inventors: Heng Wang, Shanghai (CN); Gufei Sun, Shanghai (CN); Wen-Syan Li, Fremont, CA (US)

(73) Assignee: SAP SE, Walldorf (DE)

( * ) Notice: Subject to any disclaimer, the term of this patent is extended or adjusted under 35 U.S.C. 154(b) by 257 days.

(21) Appl. No.: 14/041,908

(22) Filed: Sep. 30, 2013

(65) Prior Publication Data

US 2015/0081656 A1 Mar. 19, 2015

(30) Foreign Application Priority Data

Sep. 13, 2013 (CN) .......................... 2013 1 0416371

(51) Int. Cl.
*G06F 17/30* (2006.01)

(52) U.S. Cl.
CPC ................................ *G06F 17/3097* (2013.01)

(58) Field of Classification Search
CPC .................................................. G06F 17/3097
See application file for complete search history.

(56) References Cited

U.S. PATENT DOCUMENTS

| 7,225,182 | B2 | 5/2007 | Paine et al. |
|---|---|---|---|
| 7,925,641 | B2 | 4/2011 | Albrecht et al. |
| 8,321,399 | B2 | 11/2012 | Teufel et al. |
| 8,321,402 | B2 | 11/2012 | Reeb |
| 8,321,403 | B1 | 11/2012 | Wu et al. |
| 8,326,830 | B2 | 12/2012 | Hollingsworth |
| 8,370,329 | B2 | 2/2013 | Gutt et al. |
| 8,396,885 | B2 | 3/2013 | Timm et al. |
| 2002/0052894 | A1 | 5/2002 | Bourdoncle et al. |
| 2002/0059161 | A1 | 5/2002 | Li |
| 2007/0208714 | A1 | 9/2007 | Ture et al. |
| 2010/0161643 | A1* | 6/2010 | Gionis .............. G06F 17/30448 707/765 |
| 2010/0241647 | A1* | 9/2010 | Ntoulas et al. ............... 707/765 |
| 2011/0258148 | A1 | 10/2011 | Gao et al. |
| 2012/0191745 | A1 | 7/2012 | Velipasaoglu et al. |
| 2012/0290575 | A1* | 11/2012 | Hu et al. ....................... 707/737 |
| 2013/0117297 | A1 | 5/2013 | Liu et al. |
| 2013/0132357 | A1 | 5/2013 | Edgar et al. |
| 2015/0067644 | A1* | 3/2015 | Chakraborty et al. ........ 717/123 |

* cited by examiner

Primary Examiner — Apu Mofiz
Assistant Examiner — Dara J Glasser
(74) Attorney, Agent, or Firm — Brake Hughes Bellermann LLP

(57) ABSTRACT

A query collector may be configured to receive a plurality of queries applied by a search engine to obtain corresponding search results. A graph manager may be configured to generate, based on the plurality of queries, a directed graph of nodes, each node corresponding to at least one query and connected to another node, and further configured to merge at least two of the nodes based on a similarity of corresponding queries thereof, to obtain a merged node, and generate at least one representative query representing the merged node. A suggestion generator may be configured to match a current query with a matching node of the nodes, determine that the merged node is a successor node of the matching node within the directed graph, and provide the at least one representative query as a suggested query for a future search to be conducted by the search engine.

14 Claims, 7 Drawing Sheets

PROVISION OF SEARCH REFINEMENT SUGGESTIONS BASED ON MULTIPLE QUERIES

CROSS-REFERENCE TO RELATED APPLICATION

This application claims priority under 35 U.S.C. §119 to Chinese Patent Application 201310416371.3, filed Sep. 13, 2013, titled "PROVISION OF SEARCH REFINEMENT SUGGESTIONS BASED ON MULTIPLE QUERIES", which is incorporated herein by reference in its entirety.

TECHNICAL FIELD

This description relates to providing search suggestions.

BACKGROUND

Search engines, such as Internet search engines, are widely used to locate desired information. Conventional search engines may be configured, for example, to crawl some or all of a computer network, in order to identify information that might be desirable to include within future search results. Such information may then be indexed in order to facilitate searching thereof. In this way, upon receipt of a search query, the search engine may quickly identify and return corresponding search results.

However, it may be difficult to ensure that the returned search results include the best or most desirable information. For example, it may be difficult for a user to select appropriate keywords for inclusion within a search query. In order to address this difficulty and related issues, conventional search engines may be configured to provide suggestions for query keywords. Unfortunately, such search suggestions often fail to provide a user with appropriate keywords to enable the user to locate desired information. Consequently, the user may experience additional frustration or delay in locating desired information, or may be unable to locate the desired information at all.

SUMMARY

According to one general aspect, a system may include instructions recorded on a non-transitory computer-readable medium, and executable by at least one processor. The system may include a query collector configured to cause the at least one processor to receive a plurality of queries applied by a search engine to obtain corresponding search results. The system may include a graph manager configured to cause the at least one processor to generate, based on the plurality of queries, a directed graph of nodes, each node corresponding to at least one query and connected to another node, and further configured to cause the at least one processor to merge at least two of the nodes based on a similarity of corresponding queries thereof, to obtain a merged node, and generate at least one representative query representing the merged node. The system may include a suggestion generator configured to cause the at least one processor to match a current query with a matching node of the nodes, determine that the merged node is a successor node of the matching node within the directed graph, and provide the at least one representative query as a suggested query for a future search to be conducted by the search engine.

Implementations may include one or more of the following features. For example, the query collector may be further configured to cause the at least one processor to designate the plurality of queries as being received during one or more related search sessions, and to store a sequence in which the plurality of queries were received relative to one another during the one or more related search sessions.

Each pair of nodes may be connected by a directed edge within the directed graph which reflects an order of receipt of the underlying pair of queries. Then, each directed edge may be annotated with a weight indicating a number of times that a corresponding sequence of queries occurred. Additionally, or alternative, the graph manager may be further configured to cause the at least one processor to build an initial directed graph, evaluate each edge within a selected loop of loops within the initial directed graph, and remove at least one such edge to thereby form the directed graph as a hierarchical, tree graph.

The graph manager may include a graph builder configured to cause the at least one processor to build an initial directed graph based on a sequence in which the plurality of queries were received by the query collector, in which each pair of nodes are connected by a directed edge within the initial directed graph which reflects an order of receipt of the underlying pair of queries, and a conflict resolver configured to cause the at least one processor to identify and break loops within the initial directed graph. The conflict resolver may be further configured to cause the at least one processor to evaluate each edge within a selected loop of the loops, and remove at least one such edge that is determined to be directed from a relatively higher value query to a relatively lower value query.

Then, the conflict resolver may be further configured to cause the at least one processor to evaluate each edge within the selected loop, including evaluating a relative search quality between a pair of nodes connected thereto. Further, the relative search quality may be evaluated based on one or more of: a query count indicating a number of times a corresponding query was submitted, a click count indicating a number of times corresponding search results were selected, and a number of times a sequence of the pair of nodes occurred.

The graph manager may be further configured to cause the at least one processor to form the merged node from the at least two of the nodes, based on a similarity of search results of the corresponding queries.

According to another general aspect, a computer-implemented method for executing instructions stored on a computer readable storage medium may include receiving a plurality of queries applied by a search engine to obtain corresponding search results, and generating, based on the plurality of queries, a directed graph of nodes, each node corresponding to at least one query and connected to another node. The method may further include merging at least two of the nodes based on a similarity of corresponding queries thereof, to obtain a merged node, and generating at least one representative query representing the merged node. The method may further include matching a current query with a matching node of the nodes, determining that the merged node is a successor node of the matching node within the directed graph, and providing the at least one representative query as a suggested query for a future search to be conducted by the search engine.

Implementations may include one or more of the following features. For example, each pair of nodes may be connected by a directed edge within the directed graph which reflects an order of receipt of the underlying pair of queries, and each directed edge may be annotated with a weight indicating a number of times that a corresponding sequence of queries occurred.

In the method, generating the directed graph may include building an initial directed graph, evaluating each edge within a selected loop of loops within the initial directed graph, and removing at least one such edge to thereby form the directed graph as a hierarchical, tree graph. In generating the directed graph, the method may further include evaluating each edge within the selected loop, including evaluating a relative search quality between a pair of nodes connected thereto.

According to another general aspect, a computer program product may be tangibly embodied on a non-transitory computer-readable storage medium and may include instructions that, when executed, are configured to cause at least one processor to receive a plurality of queries applied by a search engine to obtain corresponding search results, and generate, based on the plurality of queries, a directed graph of nodes, each node corresponding to at least one query and connected to another node. The instructions, when executed, may be further configured to cause the at least one processor to merge at least two of the nodes based on a similarity of corresponding queries thereof, to obtain a merged node, and generate at least one representative query representing the merged node. The instructions, when executed, may be further configured to cause the at least one processor to match a current query with a matching node of the nodes, determine that the merged node is a successor node of the matching node within the directed graph, and provide the at least one representative query as a suggested query for a future search to be conducted by the search engine.

Implementations may include one or more of the following features. For example, each pair of nodes may be connected by a directed edge within the directed graph which reflects an order of receipt of the underlying pair of queries, and each directed edge may be annotated with a weight indicating a number of times that a corresponding sequence of queries occurred.

The instructions, when executed, may be configured to generate the directed graph including building an initial directed graph, evaluating each edge within a selected loop of loops within the initial directed graph, and removing at least one such edge to thereby form the directed graph as a hierarchical, tree graph. The instructions, when executed, may be further configured to generate the directed graph including evaluating each edge within the selected loop, and evaluating a relative search quality between a pair of nodes connected thereto.

The relative search quality may be evaluated based on one or more of: a query count indicating a number of times a corresponding query was submitted, a click count indicating a number of times corresponding search results were selected, and a number of times a sequence of the pair of nodes occurred. The instructions, when executed, may be configured to generate the at least one representative query based on an ontology base storing at least one topic related to the merged node.

The details of one or more implementations are set forth in the accompanying drawings and the description below. Other features will be apparent from the description and drawings, and from the claims.

DETAILED DESCRIPTION

Figure 1:
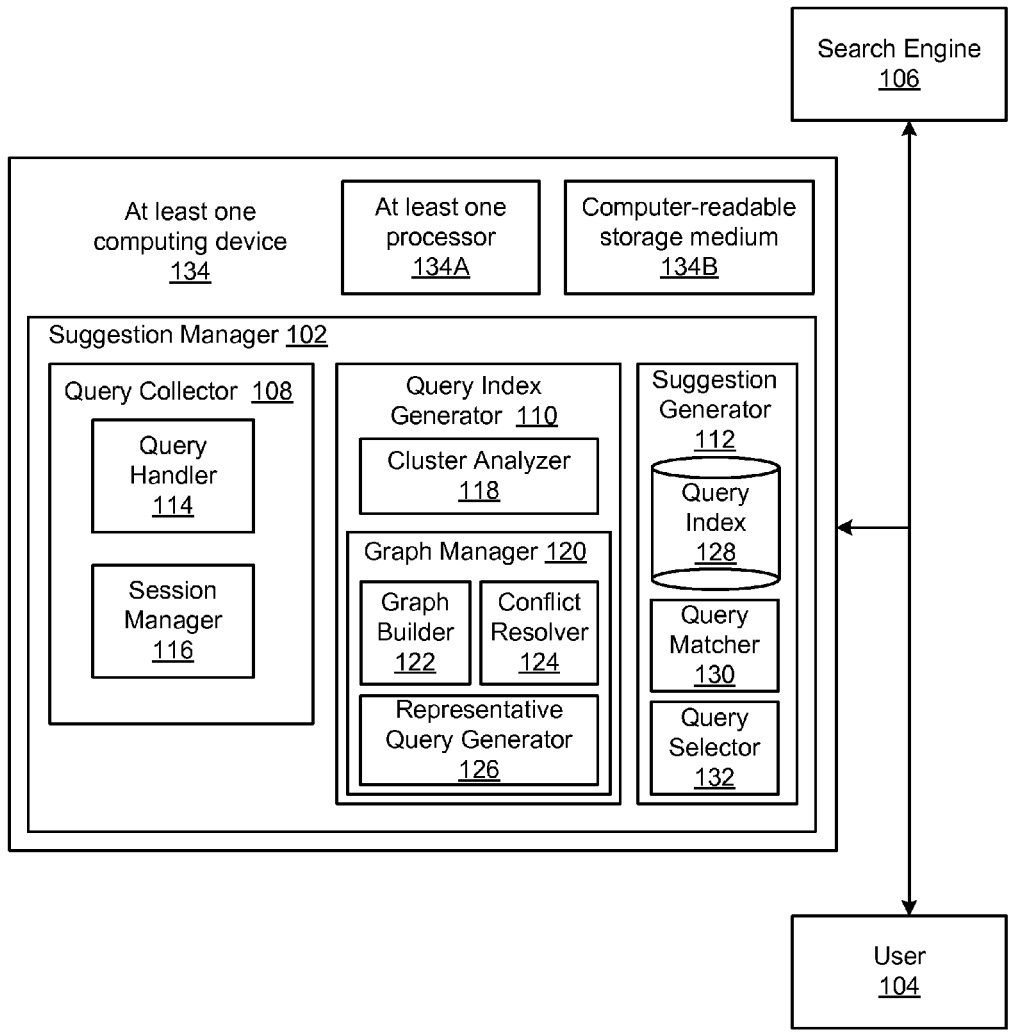
FIG. 1 is a block diagram of a system for providing search refinement suggestions based on multiple queries.

FIG. 1 is a block diagram of a system 100 for providing search refinement suggestions based on multiple queries. In the example of FIG. 1, a suggestion manager 102 provides search refinement suggestions to a user 104, to thereby assist the user 104 in conducting successful searches with a search engine 106. More specifically, as described in detail below, the suggestion manager 102 may be configured to monitor multiple queries submitted by the user 104 to the search engine 106, where the multiple queries are related to a single search being performed by the user 104. For example, the multiple queries may represent a plurality of query refinements received from the user 104, as the user 104 seeks to obtain particular, desired search results. By monitoring and analyzing multiple queries received from the user 104 (e.g., multiple query refinements during one or more searches for a particular search result), the suggestion manager 102 may provide suggestions to the user 104 for additional search refinements, so that the user 104 is more likely to obtain desired search results, with a minimum of time and effort.

The user 104 may represent, for example, virtually any human or machine capable of submitting queries to the search engine 106. By way of non-limiting example in the present description, the user 104 may be described as a human user accessing the search engine 106 over the public internet. For example, although not specifically illustrated in the simplified example of FIG. 1, the user 104 may utilize a local, otherwise conventional computing device to communicate with the search engine 106. For example, the user 104 may utilize a desktop computing device, laptop, notebook, netbook, tablet, or smartphone to implement an otherwise-conventional web browser, and may interact with the search engine 106 using the web browser. Thus, for example, the user 104 may conduct searches using a designated window or tab of the web browser.

Of course, in various implementations, searches may be conducted by the user 104 over virtually any appropriate public or private network, such as, for example, private networks implemented by individual businesses. Consequently, the search engine 106 should be understood to represent virtually any current or future search engine which is operable to receive queries from the user 104 and to return search results to the user 104.

In this regard, it may be appreciated that the search engine 106 may include, or be associated with, various and appropriate types of infrastructure. For example, the search engine 106 may be associated with a crawler to gather information, as well as an indexer to index the gathered information. The search engine 106 may further include a database configured to store the gathered, indexed information, as well as appropriate database management functionality for locating and returning specific information from within the database, in response to the queries received from the user 104. The search engine 106 also may have various capabilities with respect to receiving, logging, and processing queries, as well as capabilities for selecting and providing search results to the user 104 in response to the received queries. Such implementation details, by themselves, are generally specific to individual implementations of the search engine 106, and are therefore not described here in more detail, except as may be necessary or helpful in understanding example operations of the system 100 of FIG. 1.

In the example of FIG. 1, the suggestion manager 102 is illustrated as including a query collector 108, which may be configured to collect multiple queries submitted by the user 104 to the search engine 106. A query index generator 110 may be configured to receive some or all of the collected queries, and may be further configured to utilize the collected queries to generate a query index (illustrated in the example of FIG. 1 as query index 128, as described in detail below). Based thereon, a suggestion generator 112 may be configured to provide search refinement suggestions to the user 104. In this way, the suggestion manager 102 provides the user 104 with search refinement suggestions which are more accurate and more specific with respect to a category or attribute of the search results desired by the user 104. As described, the process of generating the search refinement suggestions is collaborative, and may be based on successive query refinements made by the user 104 as the user 104 tends to locate desired information (where query refinements may be understood to represent any successive queries which follow a previous query in a continued attempt to locate desired information). Moreover, the process for generating such search refinement suggestions may be executed quickly, so that the search refinement suggestions may be provided to the user 104 in a timely fashion, to thereby assist in ensuring that the user 104 locates desired search results in a fast and convenient manner.

In FIG. 1, the query collector 108 is illustrated as including a query handler 114 that is configured to collect queries submitted by the user 104 and related information, as well as a session manager 116 that is configured to characterize and store information obtained by the query handler 114, in terms of defined, individual sessions. For example, the query handler 114 may obtain individual queries, including individual search keywords within each query, submitted by the user 104. The query handler 114 may also obtain an order or sequence of the received queries, a number of times each query is submitted, search results provided to the user 104 in response to each query, and selections of such search results (if any) selected by the user 104.

Meanwhile, the session manager 116, as referenced, may be configured to organize and store information collected by the query handler 114, defined in terms of individual search sessions. In this regard, and as also referenced above, it is assumed that the user 104 is attempting to find a particular search result or particular piece of information, and, in so doing, the user 104 submits multiple queries. In other words, it is assumed that the user 104 is unsuccessful in a first attempt to obtain desired information, and subsequently submits additional, related, or otherwise refined queries in further attempts to obtain the desired information.

Thus, the session manager 116 is configured to identify individual search sessions in which the user 104 makes such repeated attempts to obtain desired information. For example, in a simple example, the user 104 may begin a search by submitting a first query that contains a single keyword. In reviewing the subsequent search results, the user 104 may realize that the single keyword was too broad with respect to a particular aspect or category related to the keyword of interest to the user 104, so that the user 104 submitted a second query with one or more additional keywords directed to the aspect or category. Upon reviewing the corresponding search results for the second query, the user 104 may again decide that the obtained search results are overly inclusive or otherwise undesirable. Consequently, the user 104 may submit a third query with additional or alternative keywords. In related examples, the user 104 may sometimes resubmit a previously-submitted query, and, of course, may sometimes review individual search results received in response to individual queries.

The session manager 116 is thus configured to attempt to organize such related queries into individual search sessions. For example, the session manager 116 may define a time window, so that all queries received from the user 104 within the time window are defined as being included within an individual search session.

Additionally, or alternatively, the session manager 116 may define search sessions with respect to login information received from the user 104. For example, the user 104 may log into a system, submit multiple queries, and then logout of the system. In this example, the user's queries submitted within the period of time that the user 104 was logged in may be categorized as a single session.

Similarly, in scenarios in which the user 104 is utilizing a web browser to conduct searches, the user 104 may open a browser window or browser tab in conjunction with initiating search activities. In such scenarios, the session manager 116 may identify the opening of the window and/or tab as a beginning of a session, and may define a session end in conjunction with, e.g., a time window measured from the opening, and/or in conjunction with a closing of the window/tab.

The session manager 116 may thus be configured to store information obtained by the query handler 114 in conjunction with defined search sessions. For example, the session manager 116 may assign a unique identifier for each search session, and may record a sequence number of each query received within the defined session (in other words, may identify an order in which each query was received with respect to a preceding and following query). The session manager 116 may also store each query, including individual search keywords. The session manager 116 also may store a query count, indicating a number of times a particular query was submitted within the session. In a final example, the session manager 116 may record a click count, which indicates a number of times that search results provided in response to a particular query were selected (e.g., clicked on) by the user 104). Table 1 illustrates an example table format for storing the above-referenced session information.

TABLE 1

| | |
|---|---|
| SessionID | The unique id of a search session |
| Sequence | The sequence number of this query in current session |
| Query | User input keywords |
| Query count | Number of times a query is submitted |
| Click Count | Number of search results reviewed for a query |

Of course, session information collected and organized by the session manager 116 may be organized in various additional or alternative formats. For example, table 1 illustrates a single table recording the session information described above. However, it may be appreciated that the session information may be recorded in multiple, smaller related tables, and stored using a relational database in which individual fields/records of individual tables are used as keys for relating individual tables to one another.

In the example of FIG. 1, the session manager 116 is described as defining search sessions with respect to individual search time windows and/or login or other system interactions conducted by the user 104. In other words, in the example, the session manager 116 is not described as considering actual content of individual queries. Consequently, it may occur that the session manager 116 captures unrelated queries within a particular session, such as when the user 104 simply decides to execute a different search within a given time window. Further, the user 104 may temporarily quit a search for particular desired information, but may return at a later time to resume related search attempts within what would be defined as a later session.

Of course, in various additional or alternative example implementations, the session manager 116 could be defined as including functionality related to considering such issues related to content of queries submitted by the user 104. However, in the example architecture of FIG. 1, the query index generator 110 is configured to organize and otherwise analyze query/session information received from the query collector 108 from the content perspective.

Thus, for example, the index generator 110 is illustrated as including a cluster analyzer 118, which may be configured to execute an initial determination of relatedness of individual queries. For example, on the one hand, the cluster analyzer 118 may be configured to combine or cluster individual queries which are considered to be literally similar or identical to one another. On the other hand, the cluster analyzer 118 may be configured to separate and/or delete individual queries which are considered to be clearly unrelated to other queries within a session. Of course, in such examples, the cluster analyzer 118 may be configured to store (or to cause the session manager 116 to store) such unrelated queries in a separate session, for separate analysis thereof.

A graph manager 120 of the query index generator 110 may then be configured to create a directed graph representing queries of one or more related search sessions, in which individual nodes of the directed graph correspond to individual queries (e.g., individual combinations of keywords submitted together), and in which edges connecting the nodes indicate an order or sequence in which pairs of queries were received.

More particularly, a graph builder 122 may be configured to construct an initial directed graph. An example of such an initial graph is described and illustrated below with respect to FIG. 3A. However, for purposes of FIG. 1, as just referenced, it may be appreciated that the graph builder 122 is configured to associate each individual query (and associated search keywords) with a node of the directed graph. The graph builder 122 may connect pairs of nodes with a directed edge indicating an order in which corresponding pairs of queries were received relative to one another. As also illustrated with respect to FIG. 3A, the graph builder 122 may annotate each such edge with a weight indicating a number of times that a given pair of order of queries occurred in the illustrated order.

Figure 3A:
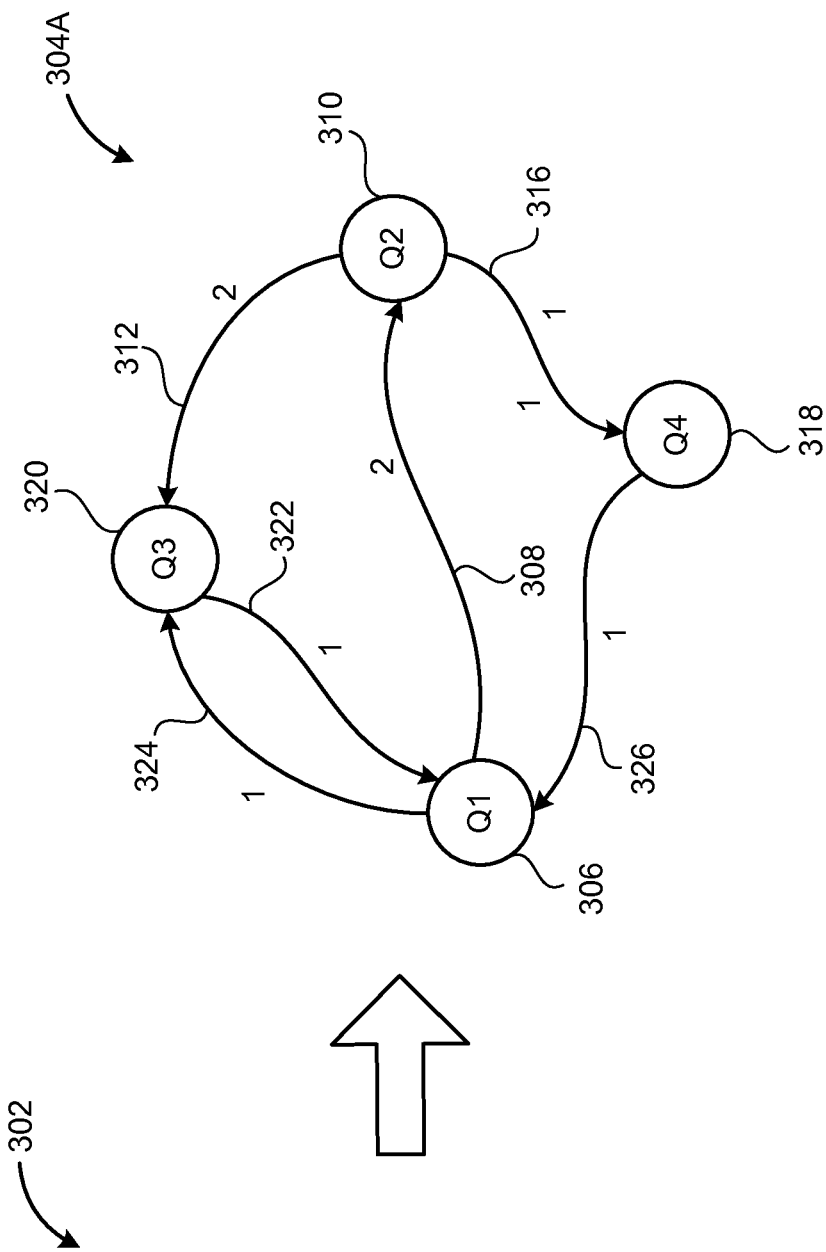
FIG. 3A is a diagram of a directed graph constructed using multiple queries in the system of FIG. 1.

As also may be observed from the example of FIG. 3A, and as described in detail with respect thereto, it may occur that an initial graph built by the graph builder 122 may include a number of loops. For example, a first query may be followed by a second query, which may itself be followed again by the first query. In another example, the user 104 may execute a first, second, and third query, and then may execute the first query a second time.

As described in detail below, such loops represent ambiguities with respect to a direction of refinement or improvement of successive queries. Therefore, as described with respect to FIGS. 3B and 3C, the conflict resolver 124 is configured to remove individual edges from the initial graph received from the graph builder 122, in a manner which resolves such ambiguities and provides a hierarchical, tree graph which illustrates a progression of query refinement from less refined to more refined.

In so doing, the conflict resolver 124 may utilize information from the query collector 108 to evaluate a search quality of connected pairs of queries/nodes with respect to one another. For example, with reference to Table 1, the conflict resolver 124 may consider, with respect to each connected pair of nodes, a number of times that each corresponding query was submitted (i.e., the query count), a number of times that one query followed directly in sequence after a preceding query, and a number of times for each query that corresponding search results were selected (i.e., the click count of Table 1). By considering such metrics of search quality, the conflict resolver 124, as referenced, may ensure that a resulting hierarchal, tree graph does not contain any loops, and generally progresses in a direction from lower quality to higher quality (or less refined to more refined) searches.

Thus, a representative query generator 126 of the graph manager 120 may receive such a resulting hierarchical, tree graph (such as is illustrated with respect to FIG. 3C) from the conflict resolver 124. As described in detail below with respect to FIGS. 3D and 4, the representative query generator 126 may be configured to merge two or more nodes from within the hierarchical, tree graph received from the conflict resolver 124, to thereby obtain at least one merged node. The representative query generator 126 may then generate a representative query for the merged node, based on, e.g., similarities between, and other aspects of, the at least two nodes that are being merged. As described with respect to the suggestion generator 112, and in more detail below with respect to FIGS. 3D, 4, and 5, the resulting representative query for an underlying merged node may serve as a basis for providing search suggestions to the user 104.

Specifically, as shown, the suggestion generator 112 is provided with a query index 128 from the graph manager 120. As described, the query index 128 includes a tree graph of ordered nodes which progresses from lower quality, less refined searches in a direction of higher quality, more refined searches.

At a given point in time, the user 104 may submit a new or current query, which may be related to the subject matter of the queries of the query index 128. A query matcher 130 may consider the received, current query from the user 104, and may attempt to relate the received query to an individual node of the tree graph of the index 128.

Upon matching the received, current query to an individual node of the query index 128, a query selector 132 may be configured to consider all successor nodes of the matched node within the index 128. In other words, the query selector 132 may follow in a direction from the matched node of the index 128 to an end of the branch of the tree index 128 in which the matched node occurs. In so doing, the query selector 132 may identify any merged node included within the considered branch. Finally, the query selector 132 may provide any representative query stored in association with an identified merged node as a search suggestion to the user 104. In this way, the suggestion generator 112 anticipates a direction of potential refinements that might be made by the user 104, and quickly and accurately provides one or more search suggestions in the direction of such potential refinements for consideration by the user 104.

Thus, the suggestion generator 112 may provide useful and timely search refinement suggestions for the user 104. The suggestion generator 112 may provide such suggestions in a variety of manners. For example, in the context of the single search or search session, the suggestion generator 112 may begin providing search suggestions for the user 104 as soon as such suggestions are available (e.g., as soon as a representative query for two merged nodes of the graph constructed by the graph manager 120 is available). In such scenarios, the user 104 may begin a search process of submitting multiple, successive queries, and may begin receiving suggested queries and/or keywords in real time, as the search progresses.

In additional or alternative examples, it may occur that the user 104 provides related searches over a period of time, e.g., over the course of a day. In such cases, the suggestion manager 102 may be configured to store the index 128 from the earlier search session, and may provide corresponding suggestions at a beginning of the subsequent search of the user 104. Further, the suggestion generator 112 may utilize further operations of the graph manager 120 in expanding the index 128 constructed during the earlier search process, to thereby leverage earlier operations of the graph manager 120 in providing current suggestions in the context of a current search session.

In the example of FIG. 1, the suggestion manager 102 is illustrated as being executed by at least one computing device 134, which is illustrated as including at least one processor 134A and a computer readable storage medium 134B. Thus, the at least one processor 134A may represent two or more processors executing in parallel, and the computer-readable storage medium 134B may represent virtually any non-transitory medium that may be used to store instructions for executing the suggestion manager 102, and related data. Further, the at least one computing device 134 may represent two or more computing devices, which may be in communication with one another.

For example, it may occur that the at least one computing device 134 represents a computing device that is separate from one or both of computing devices used by the user 104 and/or the search engine 106. However, it also may occur that the at least one computing device 134 represents a computing device associated with the search engine 106 and a second computing device associated with the user 104. In other words, it may be appreciated that portions of the suggestion manager 102 may be executed at the search engine 106, while other portions of the suggestion manager 102 may be implemented in conjunction with a computing device of the user 104.

For example, in scenarios referenced above in which the user 104 utilizes a web browser to conduct the searches using the search engine 106, available features and functions of the web browser may be utilized to perform some of the functions of the suggestion manager 102, or related functions. For example, a local cache of the web browser may be utilized to store queries in conjunction with operations of the query collector 108. Similarly, cookies may be stored using the web browser of the user 104, and may be leveraged by the query collector 108 to perform functions described above with respect to operations of the query collector 108.

At the same time, it may be appreciated that the suggestion manager 102 may be provided by a provider of the search engine 106, as a convenience for the various users of the search engine 106. Consequently, except where it may be practical or convenient to implement functionality of the suggestion manager 102 at a location of the user 104, the search engine 106 may be configured to provide functionalities of the suggestion manager 102 to its user base as a whole. Thus, it may be appreciated that various features and functions of the search engine 106 may be leveraged by the suggestion manager 102 to provide some or all of the functionalities described herein, some examples of which are provided below.

With regard to the suggestion manager 102 itself and the various modules and sub-modules 108-132 illustrated with respect thereto, it may be appreciated that the illustrated architecture is non-limiting, and merely for the sake of example. For example, it may be appreciated that any single module may be implemented as two or more sub-modules. Conversely, it may occur that any two or more modules or sub-modules may be combined for implementation as a single module or single sub-module.

Figure 2:
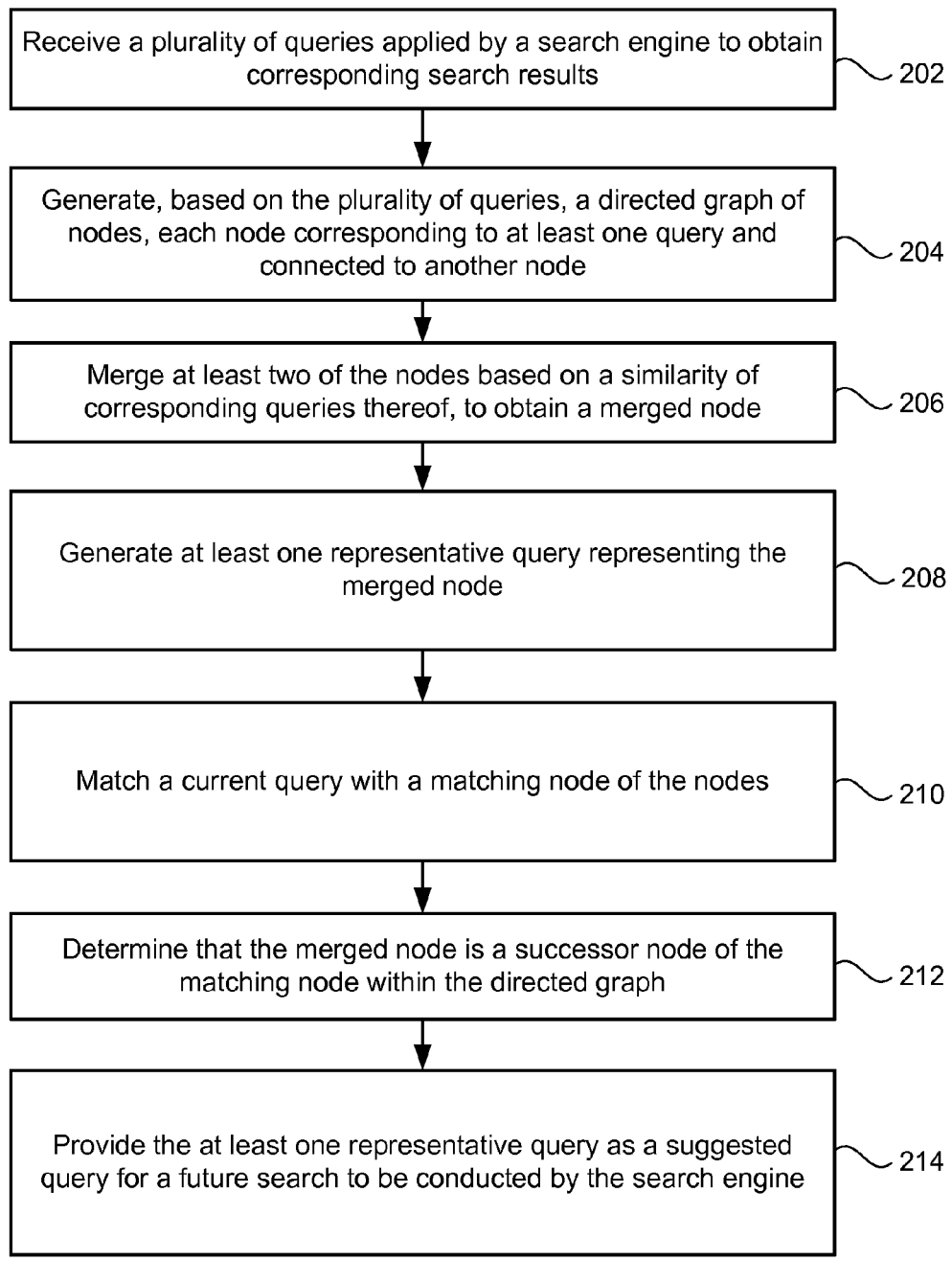
FIG. 2 is a flowchart illustrating example operations of the system of FIG. 1.

FIG. 2 is a flowchart 200 illustrating example operations of the system 100 of FIG. 1. In the example of FIG. 2, operations 202-214 are illustrated as separate, sequential operations. However, it may be appreciated that, in alternative embodiments, two or more of the operations 202-214 may be executed in a partially or completely overlapping or parallel manner, and/or in an iterative, nested, looped, or branched manner. Moreover, in any such implementations, additional or alternative operations may be included, while, in other implementations, one or more operations may be omitted.

In the example of FIG. 2, a plurality of queries applied by a search engine to obtain corresponding search results may be received (202). For example, as described, the query collector 108 may receive such a plurality of queries submitted by the user 104 to the search engine 106.

Based on the plurality of queries, a directed graph of nodes may be generated, each node corresponding to at least one query and connected to another node (204). For example, the query index generator 110 may be configured to generate an initial directed graph of nodes, as shown and described below with respect to FIG. 3A. Although not specifically illustrated in the example of FIG. 2, the query index generator 110 (e.g., the conflict resolver 124) may be further configured, if necessary, to remove any loop from the generated directed graph, or otherwise resolve existing conflicts within the directed graph, so as to obtain a hierarchical, tree graph, which proceeds generally from a direction of lower quality/less refined searches to higher quality/more refined searches, as shown and described with respect to FIGS. 3B and 3C.

At least two of the nodes may be merged, based on a similarity of corresponding queries thereof, to obtain a merged node (206). For example, as shown and described with respect to FIG. 3B, the query index generator 110 (e.g., the representative query generator 126) may be configured to merge otherwise-separate queries which are sufficiently similar from a semantic or conceptual perspective.

Then, at least one representative query representing the merged node may be generated (208). For example, the query index generator 110, e.g., the representative query generator 126, may be configured to generate such a representative query for an underlying merged node.

Subsequently, a current query may be matched with a matching node of the nodes (210). For example, the suggestion generator 112 may be configured to receive a current query from the user 104, and may be configured to match the received current query, e.g., using the query matcher 130, to at least one node of the query index 128. For example, the matching may occur based on a literal similarity, and may also consider similarities based on the same word having similar word forms or synonyms.

The merged node may be determined to be a successor node of the matching node within the directed graph (212). For example, the suggestion generator 112, e.g., the query selector 132, may examine successor nodes which follow the matched node within the query index 128, and thereby discover that the merged node is a successor node of the matched node.

The at least one representative query may be provided as a suggested query for a future search to be conducted by the search engine (214). For example, the suggestion generator 112 may provide such a representative query to the user 104, for consideration by the user 104 with respect to formulating a future search to be conducted by the search engine 106. For example, in scenarios in which the user 104 utilizes a web browser or similar interface, the search refinement suggestions may be provided in relation to a text entry box used to enter the query keywords, or may be provided within a page of search results provided in response to the current query.

FIG. 3A is a diagram illustrating a search count table 302 and its corresponding directed graph 304A. That is, the search count table 302 corresponds generally to information contained within Table 1, above. For example, the search count table 302 includes a session identifier (sid) for each of six different search sessions. The search count table 302 also contains a sequence number (seq) for illustrating a sequence of receipt of queries within each individual search session. Finally, the search count table 302 includes a column Q representing the various queries received during each search session. Specifically, as shown, each query is represented as one of four queries Q1, Q2, Q3, and Q4.

Meanwhile, the directed graph 304A captures information stored within the search count table 302. Specifically, as shown, a node 306 corresponding to query Q1 is connected by an edge 308 to a node 310 representing the query Q2. The node 310 is itself connected by an edge 312 to a node 320 representing the query Q3, as well as by an edge 316 from a node 318 representing the query Q4. Further, the node 320 is connected by an edge 322 to the node 306, while the node 306 is connected to the node 320 by an edge 324.

In FIG. 3A, the various edges of the directed graph 304 indicate a direction or sequence in which pairs of queries were received. Further, each edge is annotated with a weight indicating a number of times that the corresponding sequence of received queries occurred. For example, the edge 308 indicates that query Q1 was followed on two separate occasions by the query Q2. Thus, in the aggregate and including individual edge weights, all incoming edges for a node indicate a total number of times that the corresponding query was searched (where an initial node would include an additional query count as being the first query). For example, the node 320 representing the query Q3 has incoming edges 312 and 324, thereby indicating that the query Q3 was searched on two separate occasions.

As also may be observed from the directed graph 304A, it may occur that loops may exist with respect to two or more queries and associated nodes. For example, the nodes 306 and 320 illustrate a loop performed by edges 322 and 324, indicating that the query Q3 was received after receipt of the query Q1, but that the query Q1 was nonetheless received again after receipt of the query Q3. In another example, a loop is formed within the directed graph 304A by edges 308, 312, 322, indicating that the query Q1 was followed by the query Q2, which was followed by the query Q3, which was itself again followed by the query Q1. A similar loop for queries Q1, Q2, Q4 is defined with respect to nodes/edges 306/308, 310/316, and 318/326.

Such loops may be understood to represent a naturally-occurring consequence of the iterative manner in which the user 104 may submit queries during repeated attempts to locate desired information within search results. Nonetheless, such loops represent conflicts to be resolved with respect to the objective described above of establishing the query index 128 as a hierarchical, tree index which progresses from nodes representing queries of lower quality/less refinement to nodes representing queries of higher quality/more refinement. Thus, as referenced above with respect to FIG. 1, in order to resolve these and other conflicts, the conflict resolver 124 of the graph manager 120 may be configured to analyze the directed graph 304A for necessary modifications (e.g., removal of certain conflicting edges), in order to obtain the query index 128 as described above with respect to FIG. 1.

Thus, the conflict resolver 124 may be configured to resolve these types of conflicts by eliminating an edge within a loop, thereby breaking the loop. In so doing, the conflict resolver 124 must determine which edge or edges to eliminate. In order to do so, the conflict resolver 124 may consider each edge within a loop of nodes, and may eliminate the edge if the edge is determined to be directed from a node associated with a higher quality/more refined search toward a node associated with a lower quality/less refined search. Thus, for example, the conflict resolver 124 may compare each pair of nodes connected by an edge forming part of a loop within the graph 304A, to thereby determine which of the two corresponding queries is relatively higher quality/more refined. By eliminating such edges, the conflict resolver 124 ensures that an overall direction of a resulting graph, e.g., the query index 128 of FIG. 1, is in a direction of lower quality/less refined to higher quality/more refined searches.

Figure 3B:
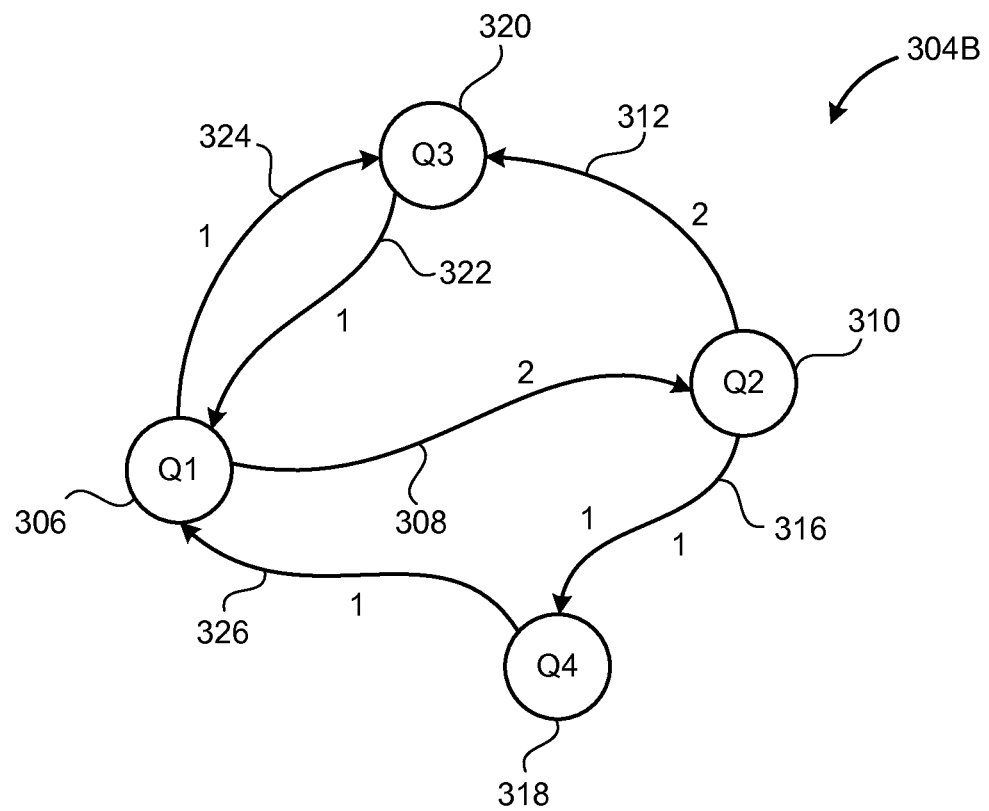
FIG. 3B is a directed graph illustrating a refinement of the directed graph of FIG. 3A.

For example, with reference to FIG. 3B, and as referenced above with respect to FIG. 3A, a loop exists between the nodes 306, 320, defined by edges 322, 324. Consequently, as just described, the conflict resolver 124 may compare queries associated with the nodes 306, 320, determine which of the pair of queries is relatively higher quality/more refined, and then eliminate the edge originating from that node (e.g., resulting in the elimination of the edge 322 in the example of FIG. 3B.

In order to compare relative search qualities of the queries Q1 and Q3, represented by the nodes 306, 320, respectively, the conflict resolver 124 may apply and consider one or more search quality metrics. In other words, the conflict resolver 124 may utilize one or more techniques for quantifying a search quality of each considered query, so that, based on the quantified search metric, comparison of the relative search qualities of the two queries becomes straightforward.

Different techniques for quantifying a search quality of a query may be utilized. For the sake of example, Algorithm 1, below, illustrates three separate search quality metrics, as well as an example technique for utilizing the three search quality metric in combination with one another to judge an overall relative search quality of a pair of queries under consideration.

In the example of Algorithm 1, a first search quality metric relates to an edge weight of each edge connecting considered pairs of nodes. In other words, a node is considered to be relatively higher quality if a weighted edge directed toward that node has a relatively high weight. In the notation of Algorithm 1, a weighted edge is represented by the letter "w" and a number representing each node being compared. Consequently, for example, the weighted edge 308 would be represented by w12, because the edge 308 connects the first node/query 306 and the second node/query 310. Thus, a weight of the edge 308 might be represented by w12=2.

Another search quality metric that may be used is the click count referenced above with respect to Table 1. As described with respect thereto, the click count references a number of times that the user 104 actually selects individual documents or other links from within a given set of search results returned in response to the query being evaluated by the search engine 106.

For example, with respect to the nodes 306, 320, it may occur that the search engine 106 returns a set of results to the user 104 in response to submission of the query Q1 of the node 306, but that the user 104 does not select any of the provided links. Conversely, it may occur that the user 104 may select a number of links provided by the search engine 106 in response to submission of the query Q3 of the node 320. Thus, the query Q3 of the node 320 would be observed to have a higher click count than the node 306 of the query Q1. In the notation of Algorithm 1, click count is represented by the notation Cr and a number of the query/node being considered. Consequently, a click count of the node 306 representing the query Q1 would be represented as Cr1.

As a final example of a search quality metric that may be used by the Algorithm 1, the query count of the search count table of Table 1 may be utilized. As referenced above, the query count references a number of times that each query was submitted by the user 104, and may be observed from the graph 304B by aggregating edge weights over all incoming edges for a node in question. As referenced above, a starting node (e.g., the node 306) will also have a query count as being an initial query, which would not be represented by an incoming edge. In the notation of Algorithm 1, a query count is represented by C with a number of the node/query in question, so that, for example, a query count for the query Q1 of the node 306 would be represented by C1=3.

As may be observed from Algorithm 1, the algorithm progresses from consideration of directed edge weights to click counts to query counts, for each pair of queries being considered. Consideration of each search quality metric includes a consideration not a ratio of the metric values to one another, in comparison to a threshold value.

For example, for a comparison of queries Q1, Q2 as shown in line 1, lines 2-10 illustrate that weighted edges, such as the edges 322, 324, may be considered. As shown, a higher weight, if any, may be considered in relation to a lower weight of the other edge within any loop being considered. Then, if a resulting ratio w12 over w21 is higher than a threshold, threshold_w, a query corresponding to the higher edge weight may be considered to be sufficiently superior in search quality to eliminate the edge originating therefrom.

However, if the ratio w12/w2w21 is not higher than the threshold, a similar calculation may be performed for click counts Cr2/Cr1. Again, if the resulting ratio is not higher than a defined threshold, threshold_Cr, than algorithm 1 proceeds to perform a similar calculation for the query count C1, C2. Again, if the resulting ratio is not higher than a predefined threshold, the algorithm determines that the two queries being considered are of roughly equal value. In such cases, the conflict resolver 124 may simply remove both edges being considered.

On the other hand, as Algorithm 1 progresses, if any of the three defined thresholds are exceeded, than the algorithm may determine that the node corresponding to the higher value (e.g., higher edge weight, higher click count, or higher query count) is sufficiently superior, and may thus remove the directed edge originating from that node and conclude operations of algorithm 1 for purposes of comparing the two nodes.

Algorithm 1 is reproduced below:

Algorithm 1
Algorithm 1 Compare two linked queries, better query will be returned, return −1 if it cannot be decided

```
 1: FUNCTION Compare (Q1, Q2)
 2:   BEGIN
 3:     IF w12 !=0 AND w21 !=0
 4:       IF w12/w21 > threshold_w
 5:         RETURN Q2
 6:       END IF
 7:       IF w21/w12 > threshold_w
 8:         RETURN Q1
 9:       END IF
10: END IF
11: IF Cr2/Cr1 > threshold_Cr
12:     RETURN Q2
13: END IF
14: IF Cr1/Cr2 > threshold_Cr
15:     RETURN Q1
16: END IF
17: IF C2/C1 > threshold_C
18:     RETURN Q2
19: END IF
20: IF C1/C2 > threshold_C
21:     RETURN Q1
22: END IF
23: RETURN −1
24: END
```

Thus, for example, with respect to the above-referenced loop formed by the edge 322 and 324 between the nodes 306 and 320, and illustrated with respect to FIGS. 3A and 3B, Algorithm 1 would first consider that the edge weight of each edge 322, 324 is equal to one, so that the ratio of the edge weights would not exceed a defined threshold. Then, if it is assumed for the sake of example that the click count of query Q3 of the node 320 is higher than the click count of the query Q1 of the node 306 by a ratio which exceeds the predefined threshold, then the query Q3 may be determined to be of superior quality with respect to the query Q1. Consequently, the conflict resolver 124 may eliminate the edge 322, and Algorithm 1 may be completed for this loop.

Figure 3C:
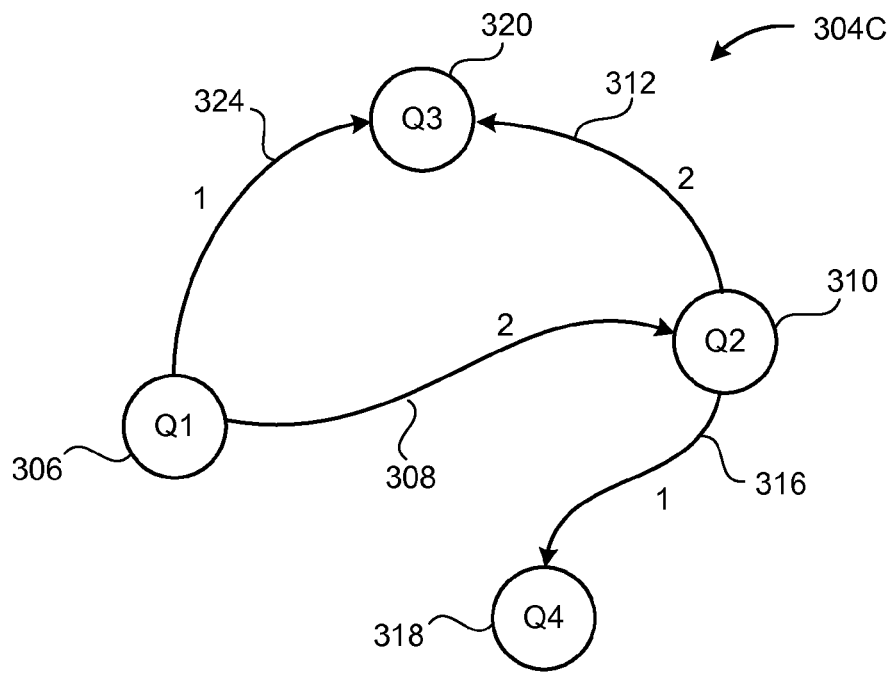
FIG. 3C is a hierarchical, tree graph derived from the graph of FIG. 3B.

Continuing the example of FIG. 3C, a loop between nodes 306, 310, 318 formed by edges 308, 316, 326 may similarly be broken by removing the edge 326. In additional or alternative examples, as referenced, it may occur that an edge between two nodes may occur in scenarios in which the two nodes are considered to be of approximately equal value, in which case the edge may be deleted. Further, it may occur that the various thresholds used in algorithm 1 may be tuned during iterations of operations of the conflict resolver 124, in order to achieve optimal results.

Figure 3D:
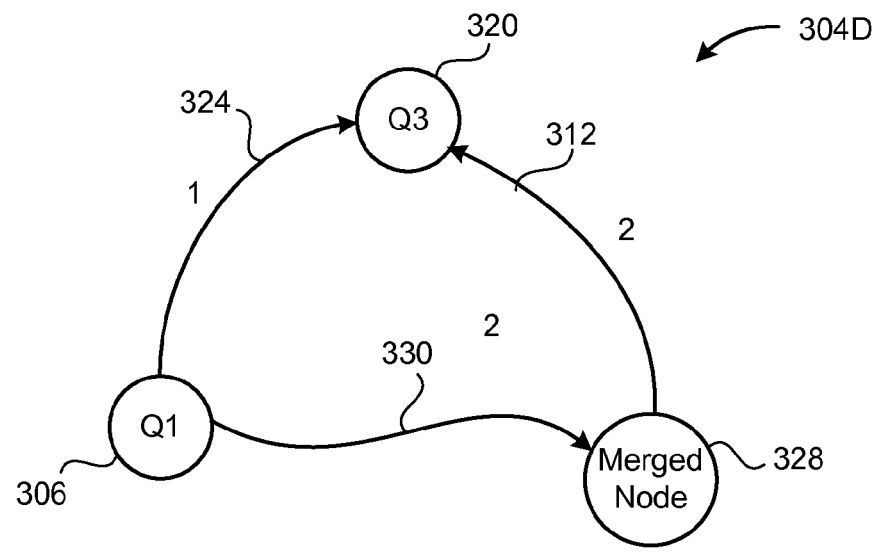
FIG. 3D is a hierarchical, tree graph derived from merging nodes of the graph of FIG. 3C.

With respect to FIG. 3D, the representative query generator 126 of FIG. 1 may be configured to identify queries which have, for a semantic or contextual perspective, the same meaning while using different wording. Such queries may then be merged, in order to reduce the size of the graph into build a query index structure, and to serve as a basis for representative queries.

For example, in FIG. 3D, the representative query generator 126 may determine that the queries Q2 of node 310 and Q4 of node 318 should be merged. Consequently, FIG. 3D illustrates a merged node 328, representing a merger of the nodes 310, 318, which is connected to the node 306 by an edge 330.

One technique for combining queries in this manner, is to combine queries with the same meaning from a linguistic perspective. For example, text analysis, linguistic analysis, or natural language processing (NLP) techniques may be used. For example, the individual query strings may be considered to be documents, and, document retrieval techniques may be used to compute distances between queries. Then, if two queries are sufficiently close, the two queries will be merged.

A second technique for combining two queries is to combine the two queries if they generate a same or sufficiently similar result set. For example, as referenced above, the search engine 106 may implement a logging system for all users. Through the use of such a logging system, the search engine 106 may avoid duplicating result sets for the same searches performed by different users, in order to use resources sufficiently. The representative query generator 126 may thus leverage information from the logging system to update relationships between result sets and queries, to thereby determine scenarios in which different but similar queries generate very similar result sets.

To compare search results in this manner in one example, the representative query generator 126 may apply a relatively higher weight to the first/earliest result pages of two result sets being compared. Then, the first result page, for example, may be compared for each query, using known algorithms to compare word sets, which may generally be configured to consider both an order and a content of individual included search results.

Figure 4:
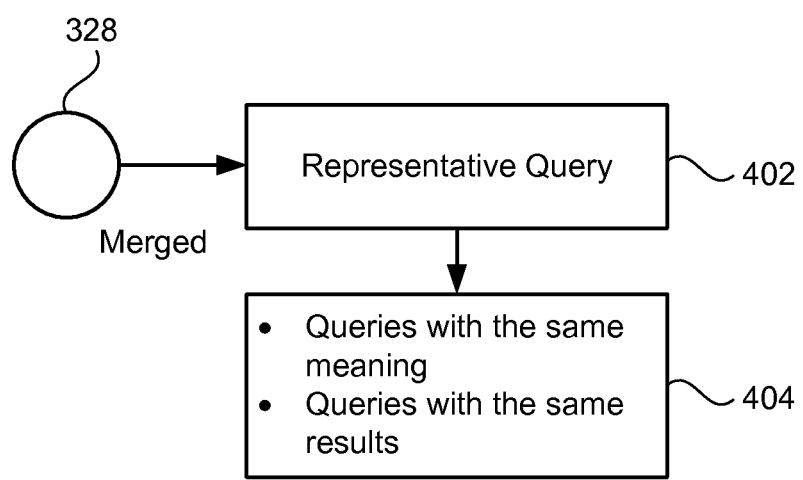
FIG. 4 is a block diagram of a merged node of FIG. 3D.

FIG. 4 illustrates the merged node 328 as being associated with a representative query 402. As illustrated with respect to box 404, and as just described, the merged node 328 and representative query 402 may be used when two or more queries are considered to have the same meaning, and/or the same results, in the sense just described above with respect to FIG. 3D.

In order to select the representative query 402, a corpus of words may be developed, including words that are representative from different perspectives on identified topics. For example, an ontology base may be used. In general, such an ontology may represent a form of representation of an identified domain of knowledge. Such an ontology thus abstractly defines a particular domain vocabulary, as well as relations between individual vocabulary terms.

Figure 5:
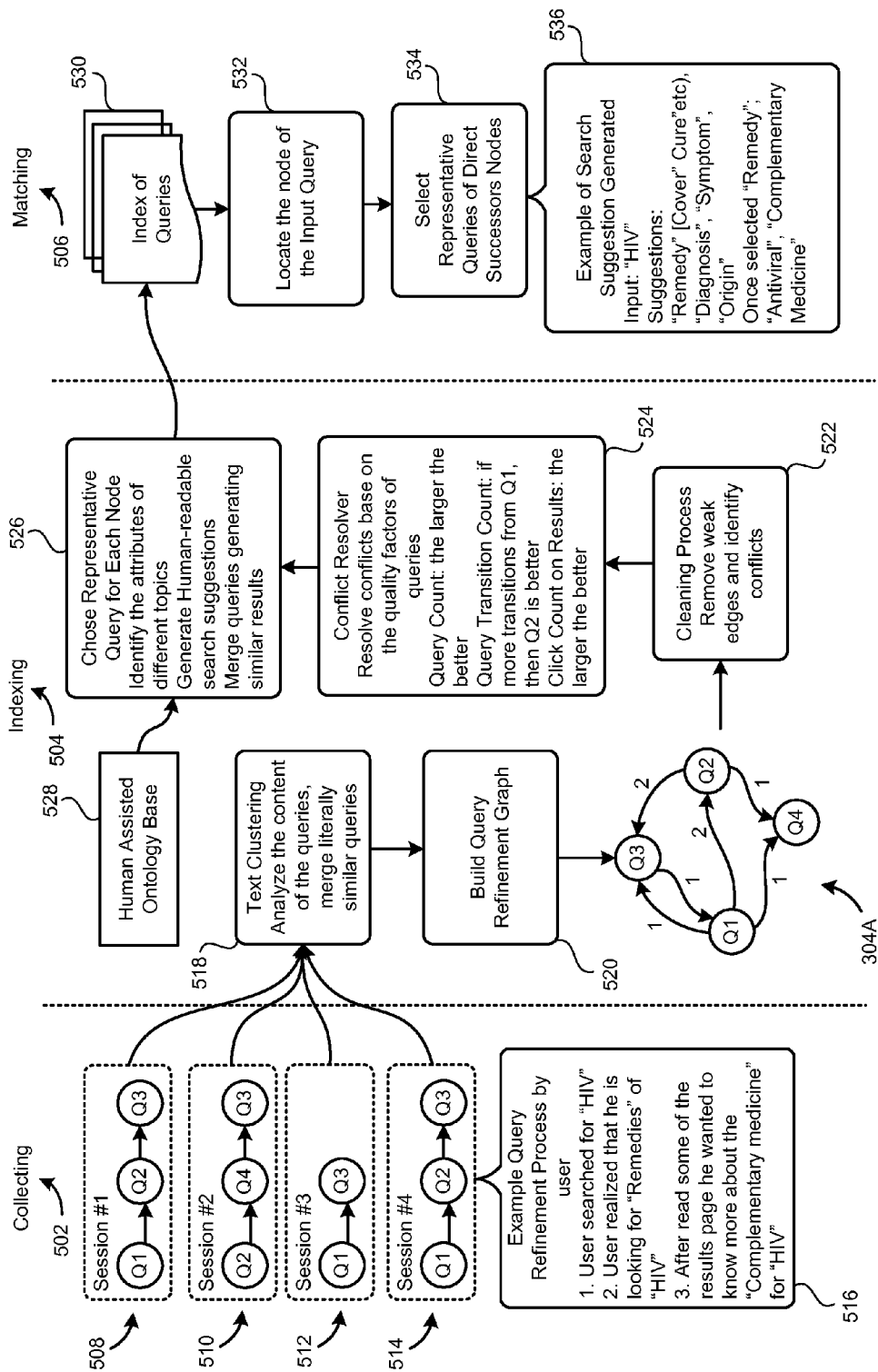
FIG. 5 is a block diagram of a more detailed architecture of the system of FIG. 1, illustrating a process flow of example operations of the system of FIG. 1.

FIG. 5 is a more detailed example architecture illustrating an example process flow for the system 100 of FIG. 1. In the example of FIG. 5, a collecting phase 502 corresponds generally to the query collector 108, while an indexing phase 504 corresponds generally to the query index generator 110. Further, a matching phase 506 corresponds generally to operations of the suggestion generator 112.

Therefore, in the illustrated collecting phase 502, four search sessions 508, 510, 512, 514 are illustrated for the sake of example. As observed from box 516 with respect to the session 514, an example query refinement process that might be used by the user 104 reflects an initial search for "HIV." In reviewing the results to the first query Q1, the user 104 may realize that he or she is most interested in "remedies" for "HIV." Subsequently, again after reviewing some of the corresponding search result pages, the user 104 may wish to know more about "complementary medicine" for "HIV" as reflected in a third query of the session 514.

During the indexing phase 504, text clustering 518 may occur, with analogy to the cluster analyzer 118 of FIG. 1. In the text clustering 518 of FIG. 5, the content of the individual queries may be analyzed, and literally similar queries may be combined. In such cases, the query counts and click counts for the combined queries may also be combined for purposes of future analysis. Somewhat similarly, sufficiently dissimilar queries, if any, may be discarded Subsequently, an initial query refinement graph 520 may be built, represented in the example of FIG. 5 again by the graph 304A of FIG. 3A. A cleaning process 522 may be conducted in which weak edges (e.g., edges between similar queries) are removed, and conflicts (e.g., loops) are identified.

Thus, conflict resolution 524 may proceed based on quality factors of compared queries. As described, quality metrics such as query count, query transition count, and click count may be utilized.

During determination of a representative query for each merged node, queries generating similar results or otherwise similar may be merged, and corresponding representative queries may be generated as potential search suggestions for the resulting merged node, based on identified attributes of known topics. As referenced above, an ontology base, such as human-assisted ontology base 528, may be utilized, which may be developed in advance for relevant domain topics.

Then, during the matching phase 506, the resulting index of queries 530 may be utilized to match a current query with an existing node of the index 530, as illustrated by box 532. Then, successor nodes of the matched node may be considered. For example, with respect to FIG. 3D, it may occur that a currently-received query is matched with the node 306 of the query Q1. By following successor nodes thereof, the merged node 328 may be identified. In this way, as illustrated by the box 534, representative queries of direct successor nodes may be selected.

For example, as demonstrated in the box 536, if the node 306 is again associated with a query Q1 of "HIV," then representative queries associated with the merged node 328 may include "remedy" (including related concepts such as "care"), "diagnosis," "symptom," "origin," and potentially other suggested terms. For the sake of further example, it may occur that the user 104 selects "remedy," in which case the process may be repeated to determine additional merged nodes and representative queries, if any. In the example of FIG. 5, thus, it may occur that a corresponding representative query of a subsequent merged node may include related concepts "antiviral," and "complimentary medicine."

In this way, the user 104 may iteratively interact with the search engine 106 and the suggestion manager 102, in order to progressively identify attributes and categories of a particular search topic in which the user 104 is interested, and thereby obtain desired results. That is, for example, in practice, it may occur that suggested refinements which are selected and used by the user 104 are considered as additional queries within a current search session. Then, such queries would be included within the corresponding directed graph in their own right, and would also be matched against other nodes/queries so as to repeat the process for any successor merged node (and associated representative query) of any such matched node(s).

Implementations of the various techniques described herein may be implemented in digital electronic circuitry, or in computer hardware, firmware, software, or in combinations of them. Implementations may be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Non-transitory information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. A system including instructions recorded on a non-transitory computer-readable medium, and executable by at least one processor, the system comprising:
   a query collector configured to cause the at least one processor to receive a plurality of queries received from a user and applied by a search engine to obtain corresponding search results, the query collector including a session manager configured to identify at least one search session of the user during which the plurality of queries were received in a sequence;
   a graph manager configured to cause the at least one processor to generate, based on the plurality of queries, an initial graph of nodes, each node corresponding to at least one query and connected by an edge to another node in an order corresponding to the sequence, wherein the order and the sequence include at least one conflict in which a first parent node is connected by a first edge to at least one child node that is itself a second parent node connected by a second edge to the first parent node, and further configured to cause the at least one processor to merge at least two of the nodes based on a similarity of corresponding queries thereof, to obtain a merged node,
   the graph manager further including
   a conflict resolver configured to detect the at least one conflict and resolve the at least one conflict including determining that the second parent node corresponds to a higher value of at least one search quality metric than the first parent node, and then removing the second edge, based on the determining, to thereby transform the initial graph into a directed graph, and
   a representative query generator configured to relate the merged node with a domain topic of an ontology base and generate at least one representative query representing the merged node, based on the ontology base; and
   a suggestion generator configured to cause the at least one processor to match a current query with a matching node of the nodes, follow the directed graph from the matching node until the merged node is reached within the directed graph, and provide the at least one representative query to the user as a suggested query for a future search to be conducted by the search engine.

2. The system of claim 1, wherein the query collector is further configured to cause the at least one processor to designate the plurality of queries as being received during at least two related search sessions, and to store a sequence in which the plurality of queries were received relative to one another during the at least two related search sessions.

3. The system of claim 1, wherein at least one directed edge of the directed graph is annotated with a weight indicating a number of times that a corresponding sequence pair of queries occurred.

4. The system of claim 1, comprising a cluster analyzer configured to combine pairs of literally-similar nodes and to discard dissimilar nodes from the initial graph.

5. The system of claim 1, wherein the at least one search quality metric includes a query count indicating a number of times a corresponding query was submitted.

6. The system of claim 1, wherein the at least one search quality metric includes a click count indicating a number of times corresponding search results were selected.

7. The system of claim 1, wherein the at least one search quality metric includes a number of times a sequence of a corresponding pair of nodes occurred.

8. The system of claim 1, wherein the graph manager is further configured to cause the at least one processor to form the merged node from the at least two of the nodes, based on a similarity of search results of the corresponding queries.

9. A computer-implemented method for executing instructions stored on a computer readable storage medium, the method comprising:
    receiving a plurality of queries from a user and applied by a search engine to obtain corresponding search results, including identifying at least one search session of the user during which the plurality of queries were received in a sequence;
    generating, based on the plurality of queries, an initial graph of nodes, each node corresponding to at least one query and connected by an edge to another node in an order corresponding to the sequence, wherein the order and the sequence include at least one conflict in which a first parent node is connected by a first edge to at least one child node that is itself a second parent node connected by a second edge to the first parent node;
    detecting the at least one conflict and resolving the at least one conflict including determining that the second parent node corresponds to a higher value of at least one search quality metric than the first parent node, and then removing the second edge, based on the determining, to thereby transform the initial graph into a directed graph;
    merging at least two of the nodes based on a similarity of corresponding queries thereof, to obtain a merged node;
    relating the merged node with a domain topic of an ontology base;
    generating at least one representative query representing the merged node, based on the ontology base;
    matching a current query with a matching node of the nodes;
    following the directed graph from the matching node until the merged node is reached within the directed graph; and
    providing the at least one representative query to the user as a suggested query for a future search to be conducted by the search engine.

10. The computer-implemented method of claim 9, wherein at least one directed edge of the directed graph is annotated with a weight indicating a number of times that a corresponding sequence pair of queries occurred.

11. The computer-implemented method of claim 9, wherein the at least one search quality metric includes at least one of: a query count indicating a number of times a corresponding query was submitted, a click count indicating a number of times corresponding search results were selected, and a number of times a sequence of a corresponding pair of nodes occurred.

12. A computer program product, the computer program product being tangibly embodied on a non-transitory computer-readable storage medium and comprising instructions that, when executed, are configured to cause at least one processor to:
    receive a plurality of queries from a user and applied by a search engine to obtain corresponding search results, including identifying at least one search session of the user during which the plurality of queries were received in a sequence;
    generate, based on the plurality of queries, directed an initial graph of nodes, each node corresponding to at least one query and connected by an edge to another node in an order corresponding to the sequence, wherein the order and the sequence include at least one conflict in which a first parent node is connected by a first edge to at least one child node that is itself a second parent node connected by a second edge to the first parent node;
    detect the at least one conflict and resolve the at least one conflict including determining that the second parent node corresponds to a higher value of at least one search quality metric than the first parent node, and then removing the second edge, based on the determining, to thereby transform the initial graph into a directed graph;
    merge at least two of the nodes based on a similarity of corresponding queries thereof, to obtain a merged node;
    relate the merged node with a domain topic of an ontology base;
    generate at least one representative query representing the merged node, based on the ontology base;
    match a current query with a matching node of the nodes;
    follow the directed graph from the matching node until determine that the merged node is reached within the directed graph; and
    provide the at least one representative query to the user as a suggested query for a future search to be conducted by the search engine.

13. The computer program product of claim 12, wherein at least one directed edge of the directed graph is annotated with a weight indicating a number of times that a corresponding sequence pair of queries occurred.

14. The computer program product of claim 12, wherein the at least one search quality metric includes at least one of: a query count indicating a number of times a corresponding query was submitted, a click count indicating a number of times corresponding search results were selected, and a number of times a sequence of the pair of nodes occurred.

* * * * *